Oct. 12, 1943. F. B. FILLO 2,331,464
THERMALLY RESPONSIVE DEVICE
Filed Nov. 14, 1940

INVENTOR
FRANCIS B. FILLO
BY
Roy M. Eilers
ATTORNEY

Patented Oct. 12, 1943

2,331,464

UNITED STATES PATENT OFFICE 2,331,464

THERMALLY RESPONSIVE DEVICE

Francis B. Fillo, Webster Groves, Mo.

Application November 14, 1940, Serial No. 365,620

6 Claims. (Cl. 297—9)

This invention relates to improvements in thermally responsive devices. More particularly, the invention relates to improvements in thermally responsive devices using expansible housings.

It is an object of the present invention to provide an improved expansible housing for thermally responsive devices.

Thermally responsive devices that use an expansible housing have been known and used for many years. These devices usually consist of a feeler bulb and an expansible housing that are connected by a tube. The feeler bulb, the expansible housing, and the connecting tube are filled with a thermally responsive fluid. Whenever the thermally responsive fluid is subjected to changes in temperature, its volume changes a good deal. This change in the volume of the fluid can be used to move a portion of the expansible housing. The movement of a portion of the expansible housing may in turn be used to actuate a lever controlled heating or cooling system. Expansible housings may, therefore, be referred to as actuating elements. By positioning the feeler bulb of a thermally responsive device in a compartment that is to be heated or cooled, the temperature of the compartment may be controlled. In all ordinary cases, this type of thermally responsive device will accurately control the temperature in the compartment. In some cases, however, the temprature surrounding the expansible housing will materially affect the operation of the thermally responsive device.

Where, for instance, the thermally responsive device is used to regulate a heating system that is to maintain the temperature in a compartment at a desired level, the heating or the cooling of the expansible housing will prevent the accurate control of the temperature in the compartment. If the expansible housing is heated, the fluid in the housing will expand and cause expansion of a portion of the housing. This expansion may be sufficient to actuate the lever controlled heating system and cut off the heat, although the temperature in the compartment is below the desired level. On the other hand, where the expansible housing is cold, the fluid therein will contract and prevent an actuation of the lever controlled heating system when the temperature in the compartment reaches the desired level. Where the thermally responsive device is arranged to control a cooling system, that is, to maintain the temperature in a compartment at a desired level, the ambient temperature at the housing is also quite important.

The decrease in the temperature at the feeler bulb results in a decrease in volume of the thermally rsponsive fluid therein, which should permit a contraction of a portion of the housing and a stopping of the flow of cooling medium. If the housing is surrounded by hot air, the expansion of the fluid therein may equal the contraction of the fluid in the feeler bulb and prevent a contraction of a portion of the housing. If the expansible housing is surrounded by cold air, the fluid in the housing may contract sufficiently to permit actuation of the lever controlled cooling system. It can be seen, therefore, that in certain cases ordinary thermally responsive devices will not operate the lever system, with which they are used, in response to the temperature at the feeler bulb. This condition can materially affect the accuracy of operation of the device, and thereby make its use somewhat objectionable. The invention obviates the objection outlined above, by providing an actuating member that is arranged to compensate the thermally responsive device of which it is an element, for the effect of ambient temperature at the member. It is, therefore, an object of the present invention to provide a compensated actuating member.

It is sometimes desirable to compensate for the effect of ambient temperature on the lever system actuated by a thermally responsive device. If the ambient temperature is high enough, parts of the lever system may expand and cause an actuation of the system although the temperature at the feeler bulb is below the desired level. Such actuation makes the operation of the thermally responsive device inaccurate. The invention obviates this objection by providing an expansible housing for thermally responsive devices that compensates for the effect of ambient temperature on the lever system used with it.

The problem of compensating thermally responsive devices of this sort is not new, and various forms have been made which have had a compensating feature therein. One of these forms consists of an actuating element that is associated with a bimetallic element. This association is such that any movement of the actuating element or expansible housing caused by ambient temperature, is compensated for by a movement in the opposite direction of the bimetallic element. Such a form is workable and can be made to operate very effectively, but it is expensive to make. In addition, such a form can only be used to advantage with lever systems that are lightly loaded because the pressure that can be exerted by such a bimetal is not sufficient to operate a heavily loaded lever system. Where, therefore, the thermally responsive device is to be used with heavily loaded systems, this form is not entirely satisfactory. The invention obviates the objections outlined above, by providing a simple thermally responsive device having an actuating member which has an ambient temperature compensation feature incorporated in the member itself.

Other objects and advantages of the invention will appear from the drawing and accompanying description.

A preferred and a modified form of the invention are shown and described in the drawing and accompanying description, but it is to be understood that the drawing and accompanying description do not limit the invention and the invention will be defined by the appended claims.

Figure 1:
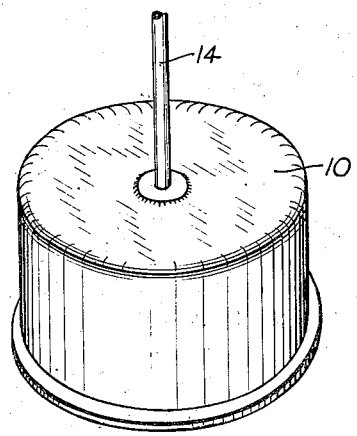
Fig. 1 is a perspective view of an expansible housing or actuating element made in accordance with the principles of the invention.

Referring to the drawing in detail, a cup-like member is denoted by the numeral 10. This member is preferably made of a metal that has a high thermal coefficient of expansion. Any of a number of suitable metals may be used, but brass is preferred because of its very high thermal coefficient of expansion. Positioned telescopically in the cup-like member 10 is a second cup-like member 12. This member is preferably made of a metal that has a relatively low thermal coefficient of expansion. Such a metal is a stainless steel which has a low coefficient of expansion, but any other suitable metal may be used. This cup-like member 12 may be secured to the cup-like member 10 by silver solder and cooperates with member 10 to form an expansible housing. In the preferred and modified forms of the invention shown in the drawing, the two cup-like members are secured together by silver solder which seals the edges of the members. Such a sealing arrangement is quite advantageous but is not an essential part of the invention. This housing is ordinarily used with a lever system that is actuated by movement of the closed end of the inner cup-like member. The outer cup-like member is usually made of heavier material and does not flex, so any movement in response to pressure is made by the closed end of the inner member.

Figure 2:
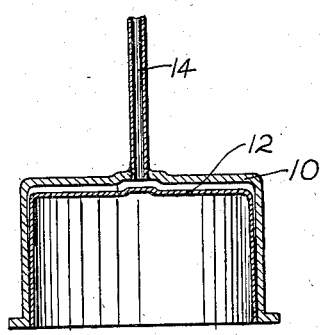
Fig. 2 is a cross-sectional view of the housing shown in Fig. 1.
Figure 3:
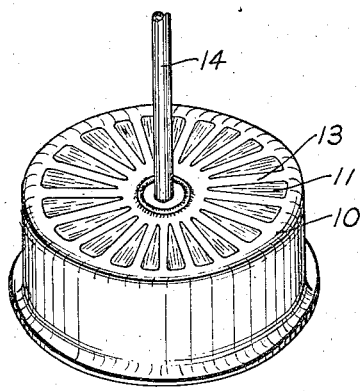
Fig. 3 is a perspective view of a modified form of the housing shown in Fig. 1.
Figure 4:
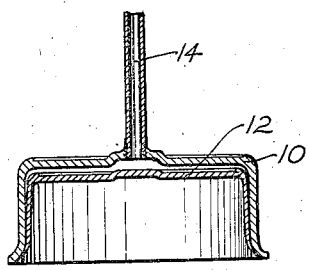
Fig. 4 is a cross-sectional view of the housing shown in Fig. 3.

In Figs. 3 and 4, a modified form of the invention is shown. This form of the invention differs from that shown in Figs. 1 and 2 in that the cup-like members have alternate depressions 11 and raised portions 13 thereon. The depressions 11 and raised portions 13 on the closed ends of the cup-like members serve to stiffen the closed ends. This stiffening of the closed ends of the cup-like members is used where high temperatures are to be regulated by the thermally responsive device.

Figure 5:
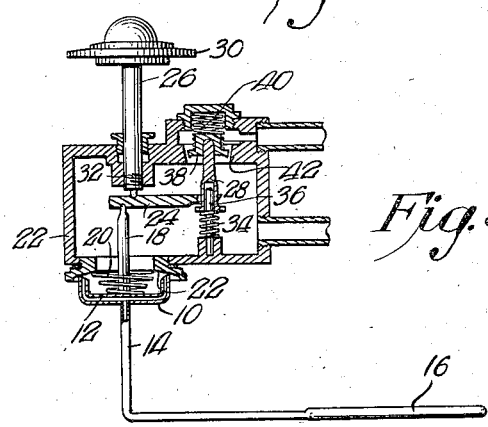
Fig. 5 is a cross-sectional view of a thermally responsive device and a lever system with which it may be used.

A tube 14 is connected to the outer of the cup-like members and communicates with the chamber formed between the two cup-like members. This tube may connect with a feeler bulb 16 which is filled with a thermally responsive fluid. The feeler bulb is positioned in a chamber, not shown, wherein it is desired to regulate the temperature. If the thermally responsive device is used to raise the temperature in the chamber to a predetermined value, the lever system is arranged so that a predetermined expansion of the fluid in the feeler bulb will shut off the heat. This can be understood by reference to Fig. 5. A lever system that is used to regulate the flow of gas to a stove is shown with a thermally responsive device. The thermally responsive device is secured to the casing 22 that contains the lever system. The inner cup-like member 12 engages one end of a lever 18 that is maintained in intimate engagement with the end of cup-like member 12 by a spring 20. This spring 20 bears against formed portions of the casing 22 in which the lever system is contained. The other end of lever 18 is formed to serve as a fulcrum for transverse lever 24. This lever engages a rod 26 and a socket member 28. The rod 26 has a dial 30 attached to one of its ends that may be rotated manually. The rotation of the dial 30 and the rod 26 to which it is rigidly secured causes a rotation of the transverse lever 24. As the rod 26 rotates, it moves longitudinally because of the engagement between its threaded portion and the threaded portion 32 of the casing 22. One end of the socket member 28 engages a spring 34 and a pin 36, and the other end of the member 28 engages a valve 38. The engagement between the transverse lever 24 and the socket member 28 is rather loose, and it cooperates with the action of the springs 34 and 40 to cause the socket member 28 to "float." The spring 40 bears against formed portions of the casing 22 and tends to force the valve 38 against the valve seat 42. This would stop the flow of gas through the casing 22.

The temperature to be regulated by the thermally responsive device is set on the dial 30. The movement of the dial determines the position of the transverse lever 24 and thereby determines the amount of movement of the inner cup-like member 12 necessary to actuate the lever system. When the feeler bulb 16 is heated, the fluid therein will expand. The expansion of the fluid in the feeler bulb will create a pressure that will be transmitted to the expansible housing and will cause an expansion of a portion of the housing. The expansion of a portion of the housing moves lever 18 upwardly. The upward movement of lever 18 causes the transverse bar 24 to rotate and permit the valve 38 to engage its seat 42 and stop the flow of gas through the casing. In this manner, the thermally responsive device shuts off the heat. If an ordinary housing is used, and is exposed to heat, the fluid therein will expand and cause the lever system to shut off the heat in the chamber although the atmosphere in the chamber might be below the desired temperature. If the housing were cold, the lever system would not be operated when the desired temperature in the chamber was reached, because additional degrees of temperature would have to be added to the temperature of the feeler bulb to secure sufficient expansion of the fluid therein to compensate for the contraction of the fluid in the housing. If the thermally responsive device is used to control a cooling system that is to maintain the temperature in a chamber at a desired level, the lever system is arranged so that a predetermined amount of contraction of the fluid in the feeler bulb will shut off the flow of the cooling medium. The contraction of the fluid in the feeler bulb results in the contraction of the housing and the actuation of the lever system. If the housing is surrounded by hot air, the contraction of the fluid in the feeler bulb may not result in a contraction of the housing, since the fluid in the housing may expand an amount equal to the contraction of the fluid in the feeler bulb. In such a case, the temperature in the chamber may fall below the desired level. If the housing is cold, the contraction of the fluid therein might actuate the lever system although the temperature in the chamber was above the desired level. From a study of the above, it can be seen that expansible housings which are not compensated against the effect of ambient temperature may prevent proper operation of the thermally responsive device.

Where a housing made in accordance with the principles of the invention is used on a thermally responsive device, the device will operate strictly according to the temperature around the feeler bulb, irrespective of the temperature around the housing. If the housing is heated, the outer member will expand more than the inner member. By proper selection of the materials from which the cup-like members are made, and by proper dimensioning of the members, the chamber formed between the members will expand at the same rate as the fluid therein expands. If, therefore, the housing is subjected to heat, the fluid and the chamber will expand the same amount and no change in pressure will result because of the heat around the housing. Since the inner cup-like member is made of metal that has a low thermal coefficient of expansion, and since no change in pressure occurs when the housing is heated, the temperature at the housing cannot cause the actuation of the lever system. If the housing is cooled by the ambient temperature, the contraction of the fluid therein will be matched by the contraction of the chamber, and no actuation of the lever system will occur. The two cup-like members are preferably soldered together because soldering does not necessitate the use of an expensive jig. The use of an expensive jig is objectionable because such use increases the cost of production. The invention, therefore, preferably uses solder to secure the two members together.

Proper dimensioning of the cup-like members 10 and 12 is important. By changing the length of the sides of the cup-like members, the amount of expansion of the chamber therein can be varied. By properly dimensioning the members 10 and 12, it is possible to over-compensate, under-compensate or exactly compensate for the expansion of the liquid in the housing and the expansion of the elements of the lever system. A designer can determine in advance what amount of compensation is desirable and can secure it by proper dimensioning of the members 10 and 12.

It can be seen from the above that by use of the present invention, an expansible housing may be provided for thermally responsive devices that is unaffected by the surrounding temperature.

Whereas a preferred and a modified embodiment of the invention has been shown and described, it is obvious to those skilled in the art that various changes and alterations may be made in the form of the invention without altering or affecting the scope of the invention.

What I claim is:

1. In combination, a lever system that expands with increases in the temperature thereof, a housing, thermally responsive fluid in said housing that expands with increases in the temperature thereof, said housing comprising a substantially inflexible cup-like member that is made of metal which has a relatively high thermal coefficient of expansion and a second cup-like member that is made of metal which has a thermal coefficient of expansion that is less than the thermal coefficient of expansion of the metal in the first said cup-like member, each of said cup-like members having a substantially closed end, an axially extending side wall and a substantially open end, said closed end of said second cup-like member being substantially flexible, said second cup-like member being positioned telescopically inside of the first said cup-like member and being secured to the first said cup-like member adjacent the open end thereof in such a manner that a chamber for the thermally responsive fluid is formed between the inner surface of the first cup-like member and the outer surface of the second cup-like member and so substantial portions of their side walls can expand and contract relative to each other and thereby change the volume of the chamber, said portions of said side walls being dimensioned axially so changes in the volume of the housing due to increases in the temperature of the housing will compensate for the expansion of the lever system and for the expansion of the thermally responsive fluid in the chamber caused by said increases in the temperature, means maintaining the open ends of said members in substantially fixed position, and means maintaining said lever system and said housing in engagement with each other whereby a movable portion of the lever system engages and is actuated by the closed end of said second cup-like member.

2. The combination of a lever system that expands with increases in the temperature thereof, an expansible housing to be used therewith and thermally responsive fluid, said housing comprising a substantially inflexible cup-like member that is made of metal which has a relatively large thermal coefficient of expansion, a second cup-like member that is made of metal which has a thermal coefficient of expansion that is less than the thermal coefficient of expansion of the first said cup-like member, each of said members having a substantially closed end, an axially extending side wall and a substantially open end, said second cup-like member being positioned telescopically in the first said cup-like member and being secured thereto adjacent the open end thereof in such a manner that a chamber for the thermally responsive fluid is formed between the inner surface of the first cup-like member and the outer surface of the second cup-like member and so substantial portions of the side walls of the members are free to expand and contract relative to each other, said portions of said sidewalls being dimensioned axially so the changes in the volume of the housing due to increases in the temperature of the housing will compensate for the expansion of the lever system and for the expansion of the thermally responsive fluid in the chamber caused by said increases in the temperature.

3. A lever system that expands with increases in the temperature thereof, an expansible housing that is usable with and adapted to actuate the said lever system, thermally responsive fluid, said housing comprising a pair of substantially parallel metallic members that have substantially cylindrical sides extending angularly therefrom, said sides being substantially coextensive with each other and being arranged so the sides of one metallic member telescope inside the sides of the other member, the larger of the said members and the sides extending angularly therefrom being made of a metal that has a higher thermal coefficient of expansion than the metal from which the other metallic member and its angularly extending sides are made, said angularly extending sides of the said members being secured together adjacent the free ends thereof to form a chamber for the thermally responsive fluid between the said members and so substantial portions of the angularly extending sides can expand and contract relative to each other and thereby cause a movement of the said metallic members relative to each other which will cause a change in the volume of the said chamber, one of said members being substantially inflexible and the other of said members having a flexible portion, maintaining said housing and said lever system in engagement with each other whereby a movable portion of the lever system engages and is actuated by the substantially flexible portion of the housing, said angularly extending sides being dimensioned axially so changes in the volume of the housing due to increases in the temperature of the housing will compensate for the expansion of the lever system and the expansion of the thermally responsive fluid in the chamber caused by said increases in the temperature.

4. The combination of a lever system that expands with increases in the temperature thereof, an expansible housing, and thermally responsive fluid, said expansible housing comprising a substantially cup-like member which has a second substantially cup-like member positioned telescopically therein, each of said members having a substantially closed end, an axially extending side wall and a substantially open end, said first cup-like member being made of metal which has a coefficient of expansion that is higher than the coefficient of expansion of the metal in the second cup-like member, said cup-like members being secured together adjacent their open ends to form a chamber between the outer surface of the second cup-like member and the inner surface of the first said cup-like member and so substantial portions of their side walls are free to expand and contract relative to each other, a portion of said housing being flexible, and means maintaining said flexible portion in engagement with a portion of the said lever system, said portions of said side walls being dimensioned axially so changes in the volume of the housing due to increases in the temperature of the housing will compensate for the expansion of the lever system and expansion of the thermally responsive fluid in the chamber caused by said increases in the temperature.

5. In combination, a thermally responsive fluid that expands with increases in the temperature thereof and a housing that contains the said fluid and is arranged to expand with the said increases in temperature and thereby compensate for the said expansion of the said fluid, said housing comprising a substantially inflexible cup-like member that is made of metal which has a relatively high thermal coefficient of expansion and a second cup-like member that is made of metal which has a thermal coefficient of expansion that is less than the thermal coefficient of expansion of the metal in the first said cup-like member, each of said cup-like members having a substantially closed end, and an axially extending side wall and a substantially open end, said closed end of said second cup-like member being substantially flexible, said second cup-like member being positioned telescopically inside of the first said cup-like member and being secured to the first said cup-like member adjacent the open end thereof in such a manner that a chamber for the thermally responsive fluid is formed between the inner surface of the first cup-like member and the outer surface of the second cup-like member and so substantial portions of their side walls can expand and contract relative to each other and thereby change the volume of the chamber, said portions of said side walls being dimensioned axially so changes in the volume of the housing due to increases in the temperature of the housing will compensate for the expansion of the thermally responsive fluid in the chamber caused by said increases in the temperature.

6. The combination of thermally responsive fluid that expands with increases in the temperature thereof and an expansible housing that contains said thermally responsive fluid and is arranged to expand with said increases in temperature, said expansible housing comprising a substantially cup-like member which has a second substantially cup-like member positioned telescopically therein, each of said members having a substantially closed end, an axially extending side wall and a substantially open end, said first cup-like member being made of metal which has a coefficient of expansion that is higher than the coefficient of expansion of the metal in the second cup-like member, said cup-like members being secured together adjacent their open ends to form a chamber between the outer surface of the second cup-like member and the inner surface of the first said cup-like member and so substantial portions of their side walls are free to expand and contract relative to each other, a portion of said housing being flexible, said portions of said side walls being dimensioned axially so changes in the volume of the housing due to increases in the temperature of the housing will compensate for the expansion of the thermally responsive fluid in the chamber caused by said increases in temperature.

FRANCIS B. FILLO.